(12) United States Patent
Bouzguarrou et al.

(10) Patent No.: US 11,461,102 B2
(45) Date of Patent: Oct. 4, 2022

(54) CIRCUITRY AND METHOD

(71) Applicant: Arm Limited, Cambridge (GB)

(72) Inventors: Houdhaifa Bouzguarrou, Valbonne (FR); Guillaume Bolbenes, Vallauris (FR); Thibaut Elie Lanois, Peymeinade (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/175,150

(22) Filed: Feb. 12, 2021

(65) Prior Publication Data

US 2022/0261252 A1 Aug. 18, 2022

(51) Int. Cl.
*G06F 9/38* (2018.01)
*G06F 9/30* (2018.01)

(52) U.S. Cl.
CPC ........ *G06F 9/3804* (2013.01); *G06F 9/30036* (2013.01); *G06F 9/30145* (2013.01); *G06F 9/30058* (2013.01); *G06F 9/3848* (2013.01)

(58) Field of Classification Search
CPC ... G06F 9/3848; G06F 9/30058; G06F 9/3804
See application file for complete search history.

(56) References Cited

U.S. PATENT DOCUMENTS

| | | | |
|---|---|---|---|
| 10,223,123 B1 * | 3/2019 | Blasco | G06F 9/30058 |
| 10,481,914 B2 | 11/2019 | Bolbenes et al. | |
| 2010/0064106 A1 * | 3/2010 | Yamada | G06F 9/325 |
| | | | 712/240 |
| 2011/0320792 A1 * | 12/2011 | Bonanno | G06F 9/3806 |
| | | | 712/240 |
| 2018/0285108 A1 * | 10/2018 | Sadasivam | G06F 9/3848 |
| 2019/0004803 A1 * | 1/2019 | Al Sheikh | G06F 9/3848 |

OTHER PUBLICATIONS

"Branch predictor", Wikipedia, last edited on Jan. 30, 2021, 12 pages.
"Branch target predictor", Wikipedia, last edited on Oct. 4, 2020, 2 pages.

* cited by examiner

*Primary Examiner* — Zachary K Huson
(74) *Attorney, Agent, or Firm* — Nixon & Vanderhye P.C.

(57) ABSTRACT

Circuitry comprises prediction storage to store, for a given branch operation, a multi-bit data item and indicator data defining a subset of bits of the multi-bit data item, the subset being one of an ordered succession of different subsets of bits of the multi-bit data item; and prediction generator circuitry to generate a predicted branch outcome for the given branch operation in dependence upon the subset of bits defined by the indicator data and, in response to generation of the predicted branch outcome, to change the subset of bits defined by the indicator data to a next subset in the ordered succession of subsets.

20 Claims, 5 Drawing Sheets

CIRCUITRY AND METHOD

BACKGROUND

This disclosure relates to circuitry and methods.

In some data processing applications, so-called branch prediction is used to predict instances of non-linear program flow, such as the outcome (branch taken or branch not taken) from conditional program flow branching instructions.

In some examples, the branch prediction process runs ahead of the execution of the instructions to provide the instructions speculatively in time to avoid so-called starvation (which would occur if insufficient instructions (that were next to be executed) were fetched in time for execution.

The present disclosure concerns potential improvements in such arrangements.

SUMMARY

In an example arrangement there is provided circuitry comprising:

prediction storage to store, for a given branch operation, a multi-bit data item and indicator data defining a subset of bits of the multi-bit data item, the subset being one of an ordered succession of different subsets of bits of the multi-bit data item; and prediction generator circuitry to generate a predicted branch outcome for the given branch operation in dependence upon the subset of bits defined by the indicator data and, in response to generation of the predicted branch outcome, to change the subset of bits defined by the indicator data to a next subset in the ordered succession of subsets.

In another example arrangement there is provided circuitry comprising:

means for storing, for a given branch operation, a multi-bit data item and indicator data defining a subset of bits of the multi-bit data item, the subset being one of an ordered succession of different subsets of bits of the multi-bit data item; and means for generating a predicted branch outcome for the given branch operation in dependence upon the subset of bits defined by the indicator data and, in response to generation of the predicted branch outcome, to change the subset of bits defined by the indicator data to a next subset in the ordered succession of subsets.

In another example arrangement there is provided a method comprising:

storing, for a given branch operation, a multi-bit data item and indicator data defining a subset of bits of the multi-bit data item, the subset being one of an ordered succession of different subsets of bits of the multi-bit data item; and generating a predicted branch outcome for the given branch operation in dependence upon the subset of bits defined by the indicator data and, in response to generation of the predicted branch outcome, changing the subset of bits defined by the indicator data to a next subset in the ordered succession of subsets.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Branch Prediction

Figure 1:
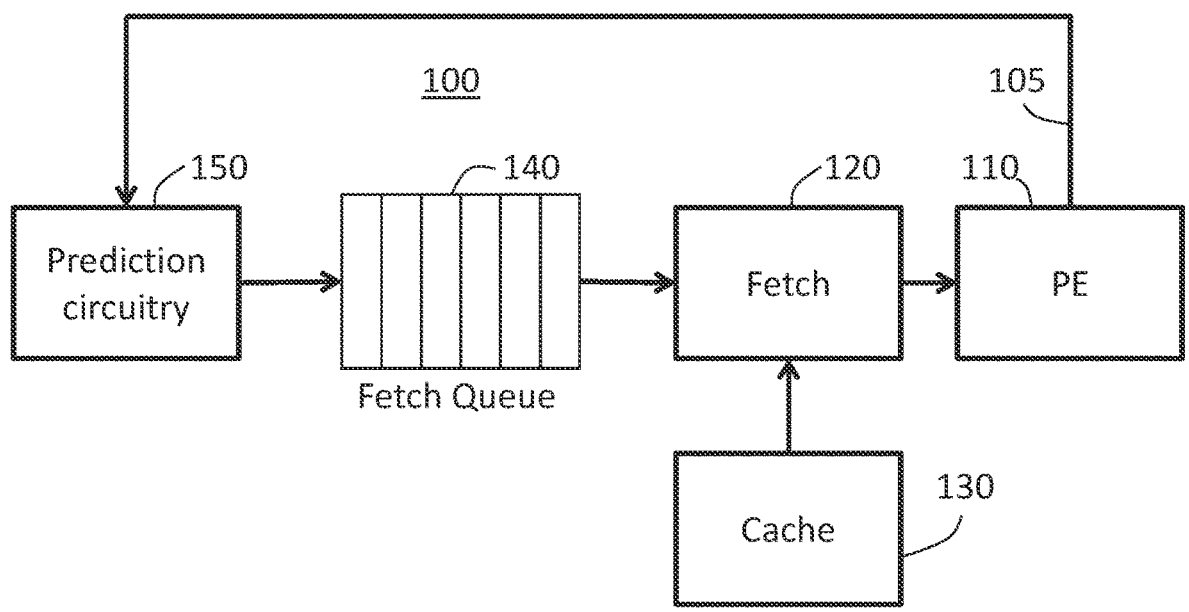
FIG. 1 schematically illustrates an example circuitry.

FIG. 1 is a schematic example of data processing circuitry 100 comprising a processing element (PE) 110 to execute program code instructions and fetch circuitry 120 to fetch instructions for execution (or blocks, containing instructions for execution), from memory (not shown) and/or a cache 130 such as an instruction cache. The instructions or blocks to be fetched are defined by a fetch queue 140. The data processing circuitry also comprises prediction circuitry 150 to predict one or more next blocks to be fetched and to add the predicted next blocks to the fetch queue 140.

Therefore, the circuitry of FIG. 1 comprises a fetch queue 140 to store one or more instructions in response to the predicted branch outcome; and fetch circuitry 120 to fetch instructions for execution from the fetch queue.

The prediction circuitry 150 uses, for example, historical data about previously taken branches and/or other data (an example of which will be discussed below) to arrive at a prediction of whether a particular branch instruction will be taken or not taken.

The processing element 110 may communicate to the prediction circuitry 150, for example by a control signal 105, whether or not predictions made by the prediction circuitry 150 were correct. In the case of an incorrect or misprediction, the execution pipeline and the fetch queue 140 would need to be flushed. Information can also be passed back by the control signal 105 to maintain a branch target prediction function by the second branch prediction circuitry 210 (as discussed below).

Figure 2:
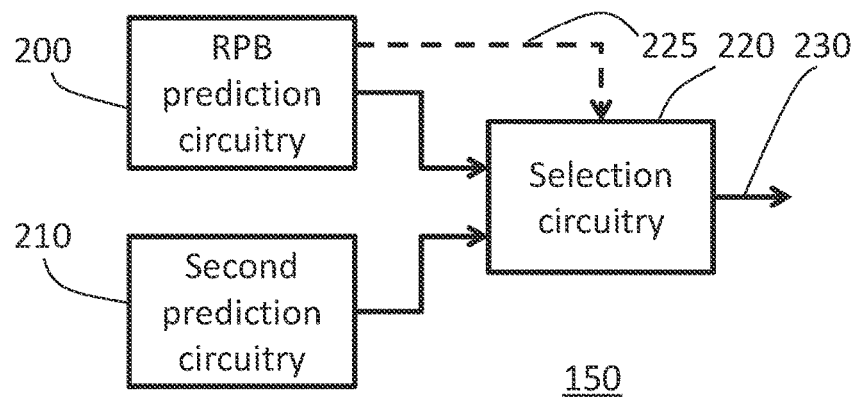
FIG. 2 schematically illustrate branch prediction circuitry.

In the present example, as shown schematically in FIG. 2, the prediction circuitry 150 may in fact comprise two prediction circuitries, operating using different respective techniques. In this example, these are a so-called "RPB" prediction circuitry 200 and a second prediction circuitry 210. In this discussion, "RBP" refers to so-called register parsing branches which will be discussed in more detail below.

The second prediction circuitry 210 can be any other prediction circuitry; various mechanisms may be used by the second prediction circuitry 210 to predict the "taken" or "not taken" status for an expected branch instruction and in at least some examples branch target prediction may also be provided to predict a target or destination of such a branch. An example of such a technique is provided in U.S. Ser. No. 15/806,605, https://en.wikipedia.org/wiki/Branch_predictor and https://en.wikipedia.org/wiki/Branch_target_predictor, the contents of each of which are hereby incorporated by reference.

The RPB prediction circuitry 200 or the second prediction circuitry 210 may predict blocks (or portions, or granules, or even in an extreme example individual instructions) of program code to be fetched and to add data identifying such blocks to the fetch queue 140, on a first-in, first-out basis. The fetch circuitry 120 retrieves such data from the fetch queue 140 on the same basis (which is to say, the fetch circuitry 120 retrieves the least-recently-added entry or entries in the fetch queue 140) and initiates fetching of the blocks indicated by those entries. The required blocks may be in the cache 130 or may need to be retrieved from a main memory or higher level cache (not shown in FIG. 1).

In at least some instances, the RPB prediction circuitry 200 and the second prediction circuitry 210 may each generate a branch prediction, at least as regards a predicted branch outcome. Selection circuitry 220 selects a prediction 230 between the outcomes predicted by the RPB prediction circuitry 200 and the second prediction circuitry 210 in dependence upon a control indication 225 which in this example is generated by the RPB prediction circuitry 200. In other words, in this example, if the RPB prediction circuitry 200 assesses its own outcome prediction as being valid, this overrides the prediction generated by the second prediction circuitry 210. The predicted outcome generated by the second prediction circuitry 210 is selected (in this example) only when the prediction generated by the RPB prediction circuitry 200 is deemed or detected to be invalid or not to be used by the RPB prediction circuitry 200 itself.

In due course, the processing element 110 executes the fetched blocks of program code. Generally speaking, the system aims to fetch program code in advance of its execution, so that processing is not itself held up by a lack of code to be executed. So in this regard the fetching is speculative and is based purely on predictions made by the prediction circuitry. The predictions of branch outcomes will be proved to be either correct or incorrect when the relevant branch instruction is finally executed or resolved. If a prediction is incorrect, it may be that the wrong branch target code has been fetched (or code at a branch target has been fetched but the branch, when resolved, was not in fact taken) and the fetch and execution pipelines have to be flushed, incurring a delay while the correct blocks of program code are fetched for execution.

The processing element can provide information 180 back to the prediction circuitry 150 relating to branch instructions actually encountered during execution, as well as their actual outcome. Where a branch instruction is encountered during execution (at least for a branch instruction where the branch is actually taken, though possibly for all branch instructions), information can be stored by the prediction circuitry 150 relating to the outcome (taken/not taken) and/or target of that branch instruction.

FIG. 1 therefore provides an example of a data processor 100 having a processing element 110 to execute data processing instructions; fetch circuitry 120 to fetch instructions for execution, defined by entries in a fetch queue 140; and prediction circuitry 150 to generate entries for the fetch queue defining one or more next data processing instructions to be fetched.

Register Parsing Branch (RBP) Techniques

So-called RBPs involve performing a branch within a repetitive loop structure, such that at each iteration of the loop the branch outcome depends upon a respective portion such as a respective bit of the contents of a register. An example pseudocode expression of such an arrangement is as follows:

```
For (int i=0; i<32; i++) {
  if ((X>>i) & 1) {
    do_something( )
  }
}
```

Here, an example loop proceeds for 32 iterations based on a loop counter variable i which progresses from 0 to 31 in single increments. The branch parsing step is defined by the second line of the pseudocode, in that the contents of a register (such as a 32-bit register) X are right-shifted by i bits and then combined with the value 1 by an AND operation. This has the effect of testing the $i^{th}$ bit of X. If that bit is equal to 1 then the schematically represented operation "do_something( )" is performed; if not this operation is not performed.

Some processing elements such as at least some example processing elements designed by Arm Limited, provide one or more assembly operations such as a so-called TBNZ operation which can assist in handling RBP operations of this nature.

```
lsr x9, x9, #1
tbnz x9, #0, branch_target
```

Here, TBNZ represents a "test bit and branch if nonzero" to a label at a PC-relative offset defined by branch_target, without affecting the condition flags. The first two parameters of this operation defined a register to be tested (in this case x9) and a bit number (#0).

The operation lsr is a logical shift right operation having the parameters [destination register to hold the shifted value; source register holding the value to be shifted; shift amount, which can refer to a further register operand or, as in this example, to an immediate value].

So, in the assembly example, the register x9 is right shifted before its least significant bit is used to control a TBNZ conditional branch operation.

Note that the example TBNZ command includes the branch destination within the opcode itself. Therefore in terms of branch prediction, all that is required for a prediction of an RPB operation is a prediction of the branch outcome (taken/not taken).

Figure 3A:
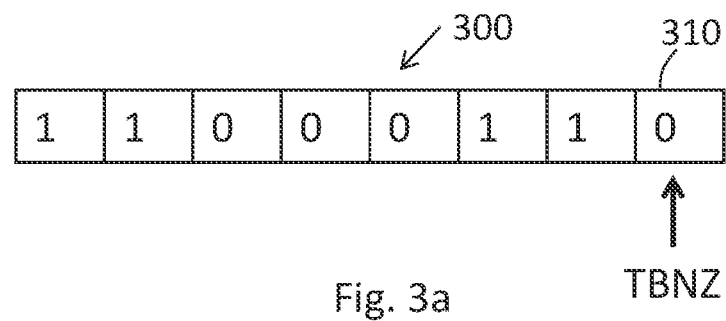
FIGS. 3a to 3c schematically illustrate a register parsing branch operation.
Figure 3B:
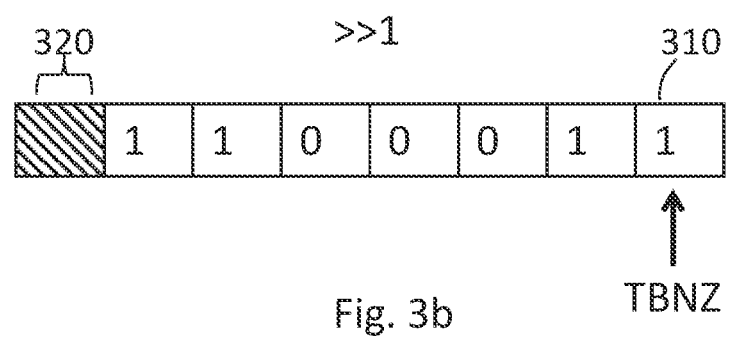
Figure 3C:
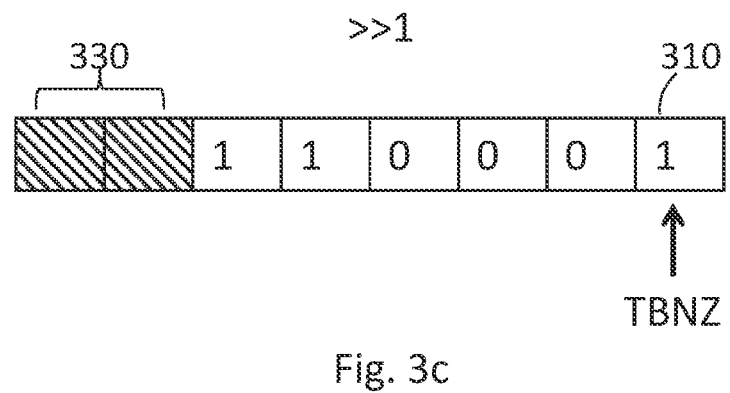

Referring to the schematic examples of FIGS. 3a-3c, an example 8-bit register 300 is shown, with its most significant bit (bit 7) drawn to the left of the representation. In a first iteration of the example loop described above, a TBNZ operation is applied in respect of the least significant bit 310. In this example, the particular bit is a 0 and the branch is not taken.

For a next iteration of the loop shown in FIG. 3b, a right shift (">>") of one bit is performed which populate the least significant bit 310 with a 1. In this case the TBNZ results and the branch being taken. Note that bit 7 of the register 300 no longer contains valid information and are shown by a shaded pattern 320 in FIG. 3b. In practice, when a right shift operation of the type described here is performed in this type of loop, dummy or padding data would be inserted into the newly emptied most significant bit. For example, all 1s or all 0s would be inserted as the padding data.

Finally in this representation, FIG. 3c shows a next iteration of the loop which populate the least significant bit with another 1 so that the branch is taken. Now, two most significant bits 330 are populated by padding data.

Significantly, note that by capturing a copy of the register or other multi-bit data item upon the basis of which this type of branching is to be controlled, and accurate branch prediction can be provided for subsequent iterations of the loop. In other words, the captured copy allows a branch predictor to accurately "see into the future" as regards the outcome of subsequent iterations of the branch operation, by basing its prediction upon a copy of the same controlled data used to determine the branch outcome at each iteration.

Figure 4:
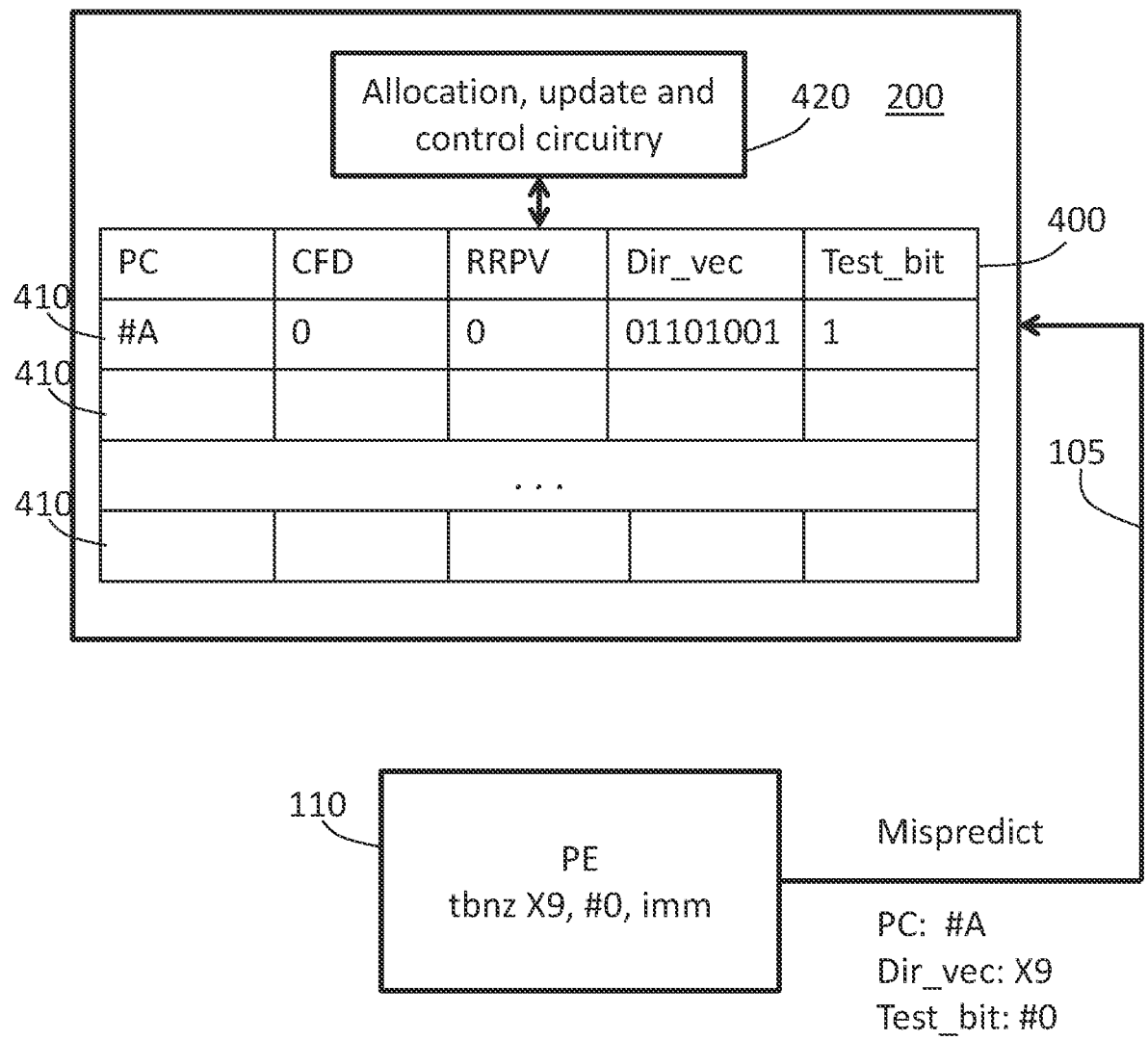
FIG. 4 schematically illustrates the use of a register parsing branch predictor.

FIG. 4 schematically illustrates the use of a register parsing branch predictor. Here, a part of the functionality of the RPB prediction circuitry 200 is shown (further aspects of the functionality being described below with reference to FIG. 7), in communication with the processing element 110, acting as processing circuitry to execute instructions including instructions defining branch operations.

The RPBP circuitry comprises storage such as random access memory to hold a table 400 having a plurality of entries 410 representing schematically in FIG. 4 as rows. Each entry may be populated with a number of data fields including the example feels listed below. These are populated and updated by allocation, update and control circuitry 420:

Program counter (PC) representing a program counter value at which an RPB prediction is to take place. In other words, the instructions executed by the processing circuitry are associated with respective program counter values; and the prediction storage is configured to store a program counter value associated with an instruction defining the given branch operation.

Confidence value (CFD): this is used by techniques such as those shown in FIG. 7 discussed below in order to determine whether or not a prediction made by the RPB prediction circuitry should be carried forward by the selection circuitry 220 of FIG. 2. The CFD value is incremented (or more generally, changed in a direction or sense indicative of greater confidence) in response to a detection that a prediction made by the RPBP circuitry was correct, and is decremented (or more generally, changed in a direction or sense indicative of lower confidence) in response to a detection that a prediction made by the RPBP circuitry was incorrect. The quantum of the increment and the quantum of the decremented may be different; for example, a correct prediction could cause the increment of the CFD value by 1 whereas a detected misprediction could cause the decrement of the CFD value by 4 or in another example the division of the CFD value by 2. In operation, as discussed below, the CFD value is compared with a threshold THS, for example a positive threshold in the case of a system using a numerically positive increment in the case of a correct prediction and a numerically negative decrement in the case of a detected misprediction.

Replacement value RRPV: this is used to control or influence the retention or eviction of entries 410 from the table 400. In an example, the RRPV is set to 1 upon allocation of a new entry 410 to the table 400. It may then be (positively) incremented on a correct prediction and (negatively) decremented on an incorrect prediction, for example by the allocation, update and control circuitry 420 varying the retention data for a branch entry in response to a detection of whether a prediction generated by the prediction generator circuitry from that branch entry is a correct prediction.

In some examples, an entry having the lowest RRPV value is evicted. However, in other examples, any entry having an RRPV greater than or equal to 1 may not in fact be evicted from the table 400, though any entry having an RRPV less than 1 may be evicted. Having said this, in these examples, an allocation operation may therefore fail if there is no free entry 410 and all of the currently populated entries have an RRPV of greater than or equal to 1. In such a situation, for example, the attempted allocation may be dropped or aborted but in response to that situation happening all currently stored RRPVs may be decremented. As described above in connection with the CFD value, the quantum of the increment and decrement may be different, and the "routine" decrement in response to a misprediction may be different to the quantum of a decrement in response to a failed allocation attempt. In some examples, these values may be respectively (+1, −1, −1) but in other examples different values such as (+1, −2, −4) may be used. The RRPV field provides an example of retention data for each branch entry, the retention data indicating a priority for retaining that branch entry at allocation of a newly initiated branch entry.

Figure 5:
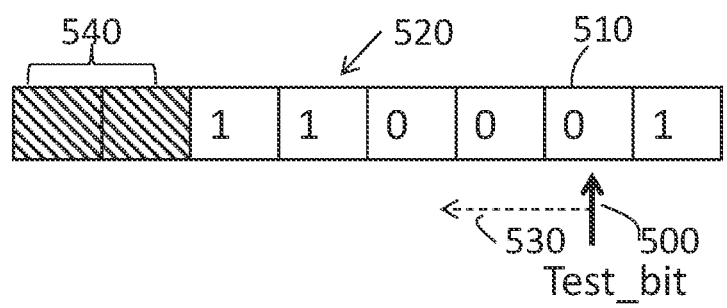
FIG. 5 schematically illustrates access to a direction vector.

Direction vector Dir_vec: this field stores a current value of the register against which the register parsing branch operation is being performed. A Test_bit field stores a prevailing value of a location within the direction vector applicable to the next RPB prediction operation. As shown schematically in FIG. 5, the Test_bit value 500 points to a particular bit location (in this example, a bit 510) within the direction vector 520. The Test_bit value progresses (in a schematic direction 530, in this example from less significance towards more significant bits) in response to each prediction operation.

In other words, the RPB prediction circuitry of FIG. 4 comprises prediction storage 400 arranged to store a plurality of branch entries 410, each having a multi-bit data item (Dir_vec) and indicator data (Test_bit), for respective branch operations of a plurality of branch operations.

Note that in at least some examples, one or both of CFD and RRPV may be updated in dependence upon whether a prediction generated by the RPB prediction circuitry 200 was correct (as indicated by the control signal 105 returned from the PE 110 to the prediction circuitry 150), even if that prediction was not used by virtue of the control signal 225 indicating that the prediction was not considered valid.

Allocation of a New Entry to the Table 400

The processing element 110 executes program code which may include register pausing branch operations. The presence of this type of operation may be detected by a decoder of the PE 110 for example. In FIG. 4, an RPB operation:

TBNZ X9, #0, imm is shown, representing a test bit and branch on nonzero operation applied to a register X9 based on the least significant bit #0 and with a branch target defined by an immediate value "imm" (this term indicating that the branch target is wholly defined within the opcode, albeit that this may be a definition relative to a prevailing program counter (PC) value).

The first time that this code is encountered in execution, assume that there is not yet an entry in the table 400 corresponding to that PC value. This implies that population of the fetch queue 140 will be handled purely by the second prediction circuitry 210 given that the RPB prediction circuitry 200 will not have generated a control signal 225 to override the output of the second prediction circuitry 210. Because this is the first time that this code is encountered, it is unlikely (though not impossible) that the second prediction circuitry would make any prediction other than to progress to the next PC value in an uninterrupted execution order.

Given that the actual outcome of the TBNZ operation is data-dependent, or in other words depends entirely on the presence of a 1 or 0 at the test bit position of the register X9, there is a 50:50 chance that the prediction made by the prediction circuitry 150 (which, as discussed above, is likely to be a prediction of the next PC value or in other words that any branch is not taken) is correct. However, dependent upon the prevailing contents of the register X9, there is also a chance that a misprediction occurs and the fetch queue 140 and execution pipeline have to be flushed. Techniques to detect misprediction, the flushing of the fetch queue and communication back to the prediction circuitry are described by U.S. Ser. No. 15/806,605 cited above and incorporated by reference.

If the prediction made by the prediction circuitry 150 was in fact correct (for example, in the case of the TBNZ branch not being taken) then no action is performed to populate the table 400 in the RPB prediction circuitry 200 at this stage.

However, if a misprediction was detected then as well as indicating the mere fact of an RPB misprediction, the PE 110 also communicates data to the prediction circuitry 150 for use in populating a newly allocated entry 410 in the RPB prediction circuitry 200. In the present example, this data comprises:

prevailing PC value (in this example, a value of #A);
prevailing value of the direction vector X9; and
prevailing value of the test location within the direction vector (in this example, #0).

This provides an example in which the processing circuitry is configured to detect an aspect of execution of a branch operation having a branch outcome dependent upon a subset of bits of a multi-bit data item and, in response to such a detection, to provide to the prediction storage the multi-bit data item, a program counter value of an instruction defining that branch operation and indicator data dependent upon the detected execution of the branch operation. In these examples, the circuitry can comprise second branch prediction circuitry (such as the circuitry 210) operable to generate a second predicted branch outcome when the prediction generator circuitry does not generate a predicted branch outcome; in which the processing circuitry is configured to detect, as the aspect of execution of a branch operation, an incorrect prediction or misprediction of the outcome of that branch operation.

Example—Monitoring In-Flight Predictions in Out of Order Processors

In another example, each entry 410 may monitor the number of inflight occurrences of the branch (inflight_nb). On a prediction (not necessarily a misprediction):

Entry.test_bit=Execution.test_bit+inflight_$nb$

Inflight_nb is computed using different solutions; one example being to compute the number of occurrences in the reorder buffer (ROB) and in the prediction pipeline. It depends on the branch being executed.

This solution potentially avoids the need for one mispredict/parsing iteration.

This arrangement can initially allocate or populate an entry in response to a first branch operation, but subsequently either repopulate the whole entry or just update at least the direction vector and test_bit with prevailing values (taking into account inflight_nb) at subsequent branches.

As above, this provides an example in which the processing circuitry is configured to detect an aspect of execution of a branch operation having a branch outcome dependent upon a subset of bits of a multi-bit data item and, in response to such a detection, to provide to the prediction storage the multi-bit data item, a program counter value of an instruction defining that branch operation and indicator data dependent upon the detected execution of the branch operation. However, in this example, the processing circuitry may be configured to detect, as the aspect of execution of a branch operation, initiation of execution of that branch operation.

In these examples, the processing circuitry may be configured in response to provide to the prediction storage at least the multi-bit data item and indicator data dependent upon the detected execution of the branch operation and any other branch operations having the same program counter value which are currently inflight for execution.

Entry Allocation

Figure 6:
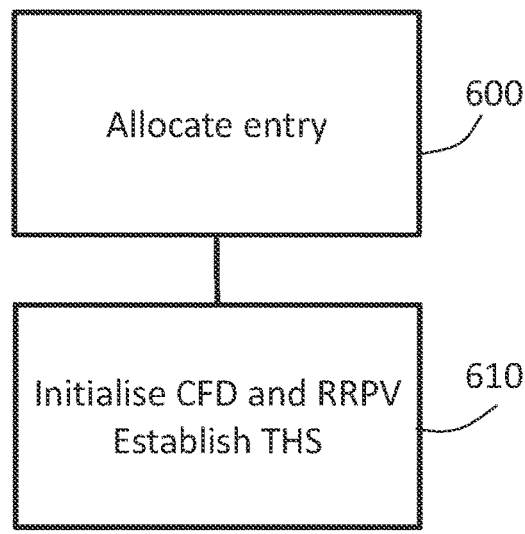
FIG. 6 is a schematic flowchart illustrating a method.

In response to receipt of this data and the indication of an RPB misprediction, the allocation, update and control circuitry 420 may perform steps illustrated schematically by the flowchart of FIG. 6. These involve allocating a new entry 410 in the table 400 at a step 600. Here, if one or more entries are currently unoccupied or marked as invalid then one of those entries is allocated. If all entries are currently occupied then the RRPV values for those entries are compared with a threshold RRPV value such as 1. Assuming that one or more current entries fails this test (in other words, for one or more such entries, RRPV<1), then one of those test-failing entries is selected for eviction and replacement by the newly allocated entry. This may be an arbitrary selection, a selection based on an age criterion (for example, using an age field, not shown) or a selection based on a lowest prevailing RRPV value. As discussed above, if allocation fails then all of the RRPV values may be decreased or decremented.

At the allocation of a new entry, the three data items received from the PE are populated into the PC and Dir_vec fields respectively.

Assuming that allocation at the step 600 succeeded, then at a step 610 the allocation, update and control circuitry 420 initialises the CFD and RRPV fields to 0 and 0 respectively and if required establishes a threshold value THS to be discussed below. Alternatively, the threshold value THS may be a predetermined value such as 2.

On allocation, the Test_bit field is set to the next appropriate value after the Test_bit value provided by the control signal 105. In this example, Test_bit is therefore set to 1 in the newly allocated entry for PC #A. The reasons for this will be discussed below with reference to FIG. 7.

Generation of a Prediction by the RPB Circuitry 200

Figure 7:
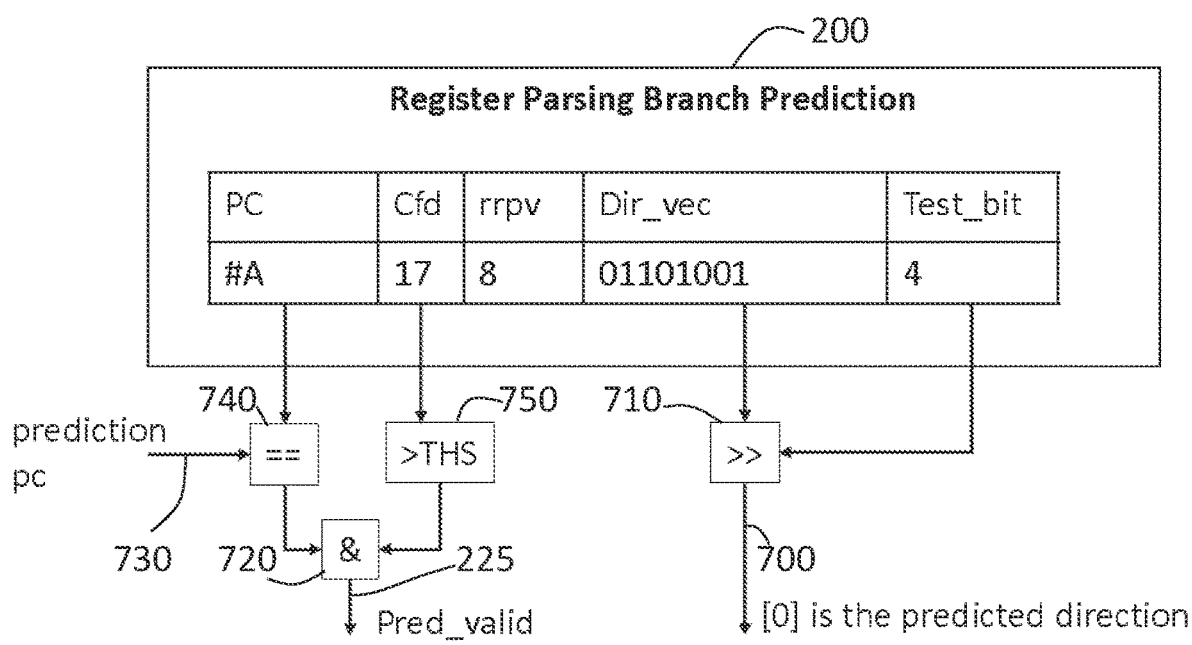
FIG. 7 provides a further schematic representation of a register parsing branch predictor.

FIG. 7 provides a further schematic representation of a register parsing branch predictor 200 showing the generation of the control signal 225 and also the actual predicted branch direction 700. Note that as mentioned above, the opcode itself contains the branch destination so all that is required from the RPB prediction circuitry itself is a prediction of whether the branch is to be taken or not. In other words, the example techniques are described with respect to a branch prediction function. The population of the fetch queue and/or the fetching of instructions for execution may be performed, for example (though not necessarily) under the control of the RPB prediction circuitry 200, on the basis of the target specified by the instruction itself (if the prediction is "taken" or the next successive instruction in a contiguous program code order (if the prediction is "not taken"). This can be obtained by inspection of the instruction and/or by retaining a copy of the instruction and/or the target associated with that PC, for example as communicated as part of the signal 150 (and/or by using target information provided by, for example, a branch target buffer of the second prediction circuitry 210).

In the example of FIG. 7, the PC and Dir_vec fields remain populated by the same value is allocated to them in FIG. 4. However, since (in this schematic example) the PC value has been encountered in execution three times already since the entry was allocated, Test_bit is now equal to 4.

Regarding the Test_bit field, the handling of this field is subtly different in the RPB prediction circuitry 200 to the way in which test bits are handled by the example TBNZ instruction. In the example looped operation discussed above, the register to be tested is subjected to a shift operation (lsr) at each iteration and the bit to be tested remains as, for example, the LSB (#0) or another particular bit position defined by an immediate value in the TBNZ instruction all of the time. So, the bits of the register to be tested progress towards the bit position under test, with that bit position remaining constant at each iteration of the instruction. In contrast, in the example circuitry of FIG. 7, the direction vector Dir_vec is not shifted or otherwise altered between iterations or between successive predictions. Instead, it is read out and a shift operation by a bit shifter 710 is controlled by the prevailing Test_bit value to generate the predicted direction 700 as the LSB of the output of the bit shifter 710. In the example shown in FIG. 7, the direction vector is shifted by four bits to the right so that the predicted direction is 0 or "not taken". A reason for handling the direction vector in this way is that it retains the whole of the information of the direction vector as received when the entry was first populated, whereas bit shifting the stored direction vector would have the effect of discarding this stored information at each iteration. This is potentially significant if the processing element is an out of order (OoO) processor, because shifting the direction vector in the RPB prediction circuitry will destroy information (unless a copy is kept of the initial value of Dir_vec for use in case of flush and restore old values). Therefore, at each iteration of RPB prediction, the allocation, update and control circuitry 420 increments the stored Test_bit value but no changes made to the stored direction vector.

Regarding the generation of the control signal 225, in the present example this may be formed as an AND combination 720 of a comparison between the prevailing PC value 730 and the stored PC field 740 on the one hand, and a threshold test 750 as to whether the confidence value CFD exceeds the threshold value THS. The control signal 225 indicates that a prediction is valid when both of these condition tests are passed. As mentioned above, when the single 225 indicates that an RPB prediction is valid this overrides (via the selection circuitry 220) any prediction made by the second prediction circuitry 210.

In other words, the prediction generator circuitry is configured to generate a (valid) predicted branch outcome for the given branch operation when the program counter value stored by the prediction storage is the same as a current program counter value applicable to execution of instructions by the processing circuitry.

Furthermore, in these examples, as discussed above the prediction storage 400 is configured to store confidence data (CFD) and to vary the confidence data in response to a detection of whether a prediction generated by the prediction generator circuitry for the given branch operation is a correct prediction. The circuitry comprises selection circuitry 720, 220 to inhibit use of a prediction generated by the prediction generator circuitry when the confidence data indicates that less than a threshold proportion of predictions generated for the given branch operation have been correct predictions. The circuitry of FIG. 1 provides an example of second branch prediction circuitry 210 operable to generate a second predicted branch outcome; in which the selection circuitry 720, 220 is configured to select between the predicted branch outcome and the second predicted branch outcome.

In examples, the selection circuitry 720, 220 is configured to select the second predicted branch outcome when the confidence data indicates that less than a threshold proportion of predictions generated for the given branch operation have been correct predictions.

Detection of all Remaining Bits being Padding Bits

Figure 8:
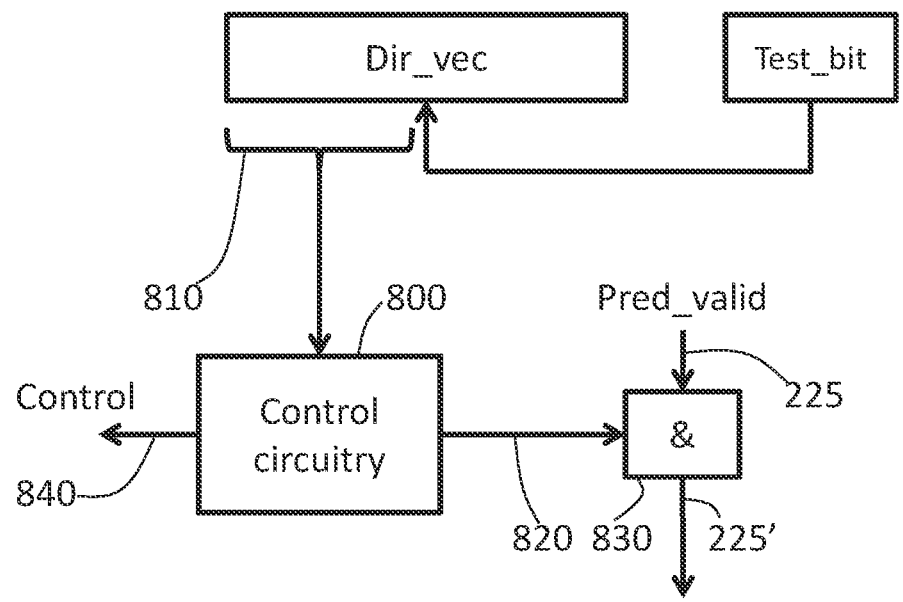
FIG. 8 schematically illustrates an aspect of control of a register parsing branch predictor.

FIG. 8 schematically illustrates another optional aspect of control of a register parsing branch predictor. Here, further control circuitry 800 is configured to access bits 810 of the direction vector Dir_vec including (i) the bit position pointed to by the current value of Test_bit and (ii) those which are more significant than the bit position pointed to by the current value of the Test_bit field. The further control circuitry can detect whether all of those bits 810 are 0 or all of those bits 810 are 1. Such a detection can indicate that all of the remaining bits to be tested may be dummy or padding bits such as the bits 320, 330 discussed above with reference to FIGS. 3b and 3c.

In a particular system in which it is known that padding bits are always 0 or are always 1 then the test applied by the further control circuitry 800 could be a test for all of the bits (i) and (ii) being the respective bit value known to be used for padding bits.

In some optional examples, the detection of remaining bits being all the same value (as discussed above) may be excluded when test_bit=31 (or another value equal to the length in bits of the direction vector−1) as an exception. In other words in such embodiments the test is not applied to a single most significant bit of the direction vector.

The rationale behind this is as follows: if multiple upper (most significant) bits are all the same, the system will probably have stopped predicting earlier (which is to say that test bit wouldn't have been incremented to reach 31). In the case that test_bit=31, this implies that previously tested bits (up to test_bit=30) were in fact valid and so there is a high probability that the bit at test_bit=31 is still valid.

So indeed, it is a risk but statistically reasonable.

So in short, bits 31/63 are treated differently in these examples.

Here, note that the population of the entry 410 for a particular PC value occurs in response to a first misprediction which, for the reasons discussed above, may not be at the first iteration of an RPB loop operation. Therefore, as represented schematically in FIG. 5, by the stage at which the direction vector field Dir_vec is first populated, the prevailing value of the register under test (X9 in this example) may already include one or more padding bits 540 from previous lsr or similar operations performed for already-executed iterations of the loop.

The control circuitry 800 detects such a situation and provides a signal 820 to a gate such as an AND operation 830 so as to gate the prediction valid signal 225 to generate a dated signal 225'. In this way, if the control circuitry 800 detects that all of the remaining bits appear to be padding data, the signal 225 is inhibited from indicating a valid prediction to the selection circuitry 220.

As an optional secondary effect of such a detection by the control circuitry 800, a control signal 840 may be provided to the allocation, update and control circuitry 420 to cause that circuitry to reduce or to zero the RRPV value for the respective entry 410.

FIG. 8 therefore provides an example of control circuitry to inhibit generation of a predicted branch outcome when remaining subsets in the ordered succession of different subsets of bits of the multi-bit data item all have the same bit value.

Improving Coding for Use with RPB Prediction

To potentially increase the usage of RPB prediction circuitry, program code can use register-parsing branches. This can be achieved by including such code in code libraries, by arranging compilers to generate such code when appropriate, of the like.

First code example:

for (i=0; i<32; i++){// Loop is easy to predict
   x=data[i];
   if (x!=0) II Branch is harder to predict as depend on data
   do_something( );

Improved code example:

uint32_t decision=0;
for (i=0; i<32; i++) {// Loop is easy to predict
   x=data(i);
   decision 1=((x!=0)>>i); // set a bit for decision
}
for (i=0; i<16; i++)
   if((decision >>i) & 1) // Predictable in principle with the RPBP circuitry discussed here.
   Do_something( )

Other Examples

In the examples given above, the loop operation used a logical shift right (lsr) in connection with a TBNZ operation testing the prevailing least significant bit (#0). The effect on the operation of the RBP prediction circuitry is that each subset of bits comprises one respective bit of the multi-bit data item and an ordered succession of test positions is a succession of adjacent bit positions of the multi-bit data item.

However, various other options may be used.

For example, instead of the TBNZ operation which normally tests only one bit, an operation could be used to test pairs or other groups of bits of a register or other data item under test. The pairs or other groups could be contiguous with respect to the multi-bit data item under test or non-contiguous. In other examples, although a single lsr operation was used in the example given above, the test bit (or test bits in the case of a group of bits under test) position could progress by a difference number of bit positions between iterations.

Consider the following example:

lsr x9, x9, #2
tbnz x9, #0, branch_target

Here, the test bit position advances by 2 bits between iterations, as defined by the shift amount of #2 associated with the lsr instruction. Similarly, in the RPB prediction circuitry 200, Test_bit would advance by +2 between predictions. More generally the shift at each iteration can be by n bit positions (where n>=1).

In another example:

lsl x9, x9, #n
tbnz x9, #31, branch_target

Here, a logical shift left (lsl) operation of n bits (where n>=1) is used instead of the lsr operation described earlier, and the TBNZ operation tests bit 31 rather than bit 0. Similarly, in the RPB prediction circuitry 200, Test_bit would change by −1 between predictions.

In another schematic example, assume that an instruction set contains an instruction capable of performing a test on multiple bits as follows:

Let T_CB_AND_Z be an instruction to test a couple [of] bits AND branch when zero T_CB_AND_Z x9, #5, branch_target The schematic instruction will do an END between bits #5 and #6 (contiguous) and if the result if 0, the branch is taken. In this case the code will look like:

lsr x9, x9, #2
tcbandz x9, #0, branch_target

Note that the AND can be replaced by XOR or any other Boolean function taking n input bits.

In the case that multiple options are available for an RPB loop operation to be executed by the PE 110, such as the options described above, the PE 110 can provide one or more further parameters to the RPB prediction circuitry 200 as part of the control signal 105, such as one or more of: (i) an indication of the direction or sense of progression of bit positions between iterations, for example left or right; (ii) an indication of the quantum of progression between iterations, for example 1 bit or a different number of bits; (iii) an indication of the number of bits used at each RPB operation, for example 1 bit or a different number of bits or a particular configuration of bits.

In general terms, the RPB prediction circuitry 200 provides an example having prediction storage 400 to store, for a given branch operation, a multi-bit data item and indicator data (such as Test_bit but also potentially encompassing the options just discussed) defining a subset of bits of the multi-bit data item (for example, a single bit or a group of bits), the subset being one of an ordered succession of different subsets of bits of the multi-bit data item (for example, progressing by +1, −1, or +/−n bit positions between iterations as discussed above; and prediction generator circuitry (FIG. 7) to generate a predicted branch outcome for the given branch operation in dependence upon the subset of bits defined by the indicator data and, in response to generation of the predicted branch outcome, to change the subset of bits (for example by incrementing Test_bit) defined by the indicator data to a next subset in the ordered succession of subsets.

For example, the multi-bit data item may be a direction vector is stored by an entry 410 or could be another multi-bit data item.

Summary Method

Figure 9:
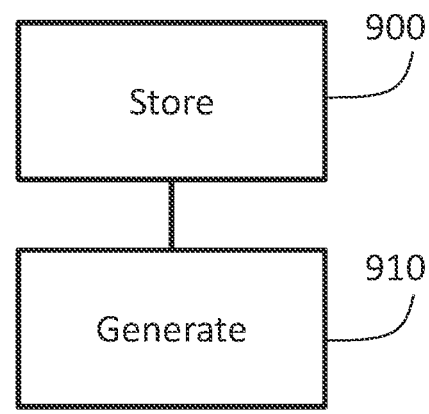
FIG. 9 is a schematic flowchart illustrating a method.

By way of summary of the techniques discussed above, FIG. 9 is a schematic flowchart illustrating a method (which can, for example, be implemented by the circuitry described above) comprising:

storing (at a step 900), for a given branch operation, a multi-bit data item and indicator data defining a subset of bits of the multi-bit data item, the subset being one of an ordered succession of different subsets of bits of the multi-bit data item; and generating (at a step 910) a predicted branch outcome for the given branch operation in dependence upon the subset of bits defined by the indicator data and, in response to generation of the predicted branch outcome, changing the subset of bits defined by the indicator data to a next subset in the ordered succession of subsets.

Summary

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:
   prediction storage to store, for a given branch operation, a multi-bit data item and indicator data defining a subset of bits of the multi-bit data item, the subset being one of an ordered succession of different subsets of bits of the multi-bit data item; and
   prediction generator circuitry to generate a predicted branch outcome for the given branch operation in dependence upon the subset of bits defined by the indicator data and, in response to generation of the predicted branch outcome, to change the subset of bits defined by the indicator data to a next subset in the ordered succession of subsets.

2. The circuitry of claim 1, in which each subset of bits comprises one respective bit of the multi-bit data item.

3. The circuitry of claim 2, in which the ordered succession is a succession of adjacent bit positions of the multi-bit data item.

4. The circuitry of claim 1, in which the prediction storage is configured to store a plurality of branch entries, each having a multi-bit data item and indicator data, for respective branch operations of a plurality of branch operations.

5. The circuitry of claim 4, in which the prediction storage is configured to store retention data for each branch entry, the retention data indicating a priority for retaining that branch entry at allocation of a newly initiated branch entry.

6. The circuitry of claim 5, comprising control circuitry to vary the retention data for a branch entry in response to a detection of whether a prediction generated by the prediction generator circuitry from that branch entry is a correct prediction.

7. The circuitry of claim 1, comprising:
   processing circuitry to execute instructions including instructions defining branch operations.

8. The circuitry of claim 7, in which:
   the instructions are associated with respective program counter values; and
   the prediction storage is configured to store a program counter value associated with an instruction defining the given branch operation.

9. The circuitry of claim 8, in which the processing circuitry is configured to detect an aspect of execution of a branch operation having a branch outcome dependent upon a subset of bits of a multi-bit data item and, in response to such a detection, to provide to the prediction storage the multi-bit data item, a program counter value of an instruction defining that branch operation and indicator data dependent upon the detected execution of the branch operation.

10. The circuitry of claim 9, comprising:
    second branch prediction circuitry operable to generate a second predicted branch outcome when the prediction generator circuitry does not generate a predicted branch outcome;
    in which the processing circuitry is configured to detect, as the aspect of execution of a branch operation, an incorrect prediction of the outcome of that branch operation.

11. The circuitry of claim 9, in which:
    the processing circuitry is configured to detect, as the aspect of execution of a branch operation, initiation of execution of that branch operation; and
    in response to such a detection, the processing circuitry is configured to provide to the prediction storage at least the multi-bit data item and indicator data dependent upon the detected execution of the branch operation and any other branch operations having the same program counter value which are currently inflight for execution.

12. The circuitry of claim 8, in which the prediction generator circuitry is configured to generate a predicted branch outcome for the given branch operation when the program counter value stored by the prediction storage is the same as a current program counter value applicable to execution of instructions by the processing circuitry.

13. The circuitry of claim 7, comprising:
    a fetch queue to store one or more instructions in response to the predicted branch outcome;
    fetch circuitry to fetch instructions for execution from the fetch queue.

14. The circuitry of claim 1, in which the prediction storage is configured to store confidence data and to vary the confidence data in response to a detection of whether a prediction generated by the prediction generator circuitry for the given branch operation is a correct prediction.

15. The circuitry of claim 14, comprising selection circuitry to inhibit use of a prediction generated by the prediction generator circuitry when the confidence data indicates that less than a threshold proportion of predictions generated for the given branch operation have been correct predictions.

16. The circuitry of claim 15, comprising:
    second branch prediction circuitry operable to generate a second predicted branch outcome;
    in which the selection circuitry is configured to select between the predicted branch outcome and the second predicted branch outcome.

17. The circuitry of claim 16, in which the selection circuitry is configured to select the second predicted branch outcome when the confidence data indicates that less than a threshold proportion of predictions generated for the given branch operation have been correct predictions.

18. The circuitry of claim 2, comprising control circuitry to inhibit generation of a predicted branch outcome when remaining subsets in the ordered succession of different subsets of bits of the multi-bit data item all have the same bit value.

19. Circuitry comprising:
    means for storing, for a given branch operation, a multi-bit data item and indicator data defining a subset of bits of the multi-bit data item, the subset being one of an ordered succession of different subsets of bits of the multi-bit data item; and
    means for generating a predicted branch outcome for the given branch operation in dependence upon the subset of bits defined by the indicator data and, in response to generation of the predicted branch outcome, to change the subset of bits defined by the indicator data to a next subset in the ordered succession of subsets.

20. A method comprising:

storing, for a given branch operation, a multi-bit data item and indicator data defining a subset of bits of the multi-bit data item, the subset being one of an ordered succession of different subsets of bits of the multi-bit data item; and generating a predicted branch outcome for the given branch operation in dependence upon the subset of bits defined by the indicator data and, in response to generation of the predicted branch outcome, changing the subset of bits defined by the indicator data to a next subset in the ordered succession of subsets.

* * * * *